US010032252B2

United States Patent
Azuma

(10) Patent No.: US 10,032,252 B2
(45) Date of Patent: Jul. 24, 2018

(54) IMAGE PROCESSING APPARATUS, IMAGE CAPTURING APPARATUS, IMAGE PROCESSING METHOD, AND NON-TRANSITORY COMPUTER READABLE STORAGE MEDIUM

(71) Applicant: CANON KABUSHIKI KAISHA, Tokyo (JP)

(72) Inventor: Katsuhiko Azuma, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/333,403

(22) Filed: Oct. 25, 2016

(65) Prior Publication Data
US 2017/0124682 A1 May 4, 2017

(30) Foreign Application Priority Data

Oct. 30, 2015 (JP) ................................ 2015-214802
Oct. 3, 2016 (JP) ................................ 2016-196000

(51) Int. Cl.
G06K 9/00 (2006.01)
G06T 3/40 (2006.01)
G06T 5/10 (2006.01)

(52) U.S. Cl.
CPC ............. *G06T 3/4015* (2013.01); *G06T 5/10* (2013.01); *G06T 2207/20064* (2013.01)

(58) Field of Classification Search
None
See application file for complete search history.

(56) References Cited

U.S. PATENT DOCUMENTS

| 6,154,493 A * | 11/2000 | Acharya | H04N 1/648 |
| | | | 348/398.1 |
| 6,642,962 B1 * | 11/2003 | Lin | G06T 3/4007 |
| | | | 348/223.1 |
| 2004/0028128 A1 * | 2/2004 | Sugiyama | H04N 9/8042 |
| | | | 375/240.03 |

(Continued)

FOREIGN PATENT DOCUMENTS

JP 2003-125209 4/2003

OTHER PUBLICATIONS

Chung et al, Color Demosaicing Using Variance of Color Differences, 2944 IEEE Transactions on Image Processing, vol. 15, No. 10, Oct. 2006.*

*Primary Examiner* — Andrae S Allison
(74) *Attorney, Agent, or Firm* — Fitzpatrick, Cella, Harper & Scinto

(57) ABSTRACT

An image processing apparatus for encoding image data of a Bayer arrangement, comprising, a color separation unit configured to separate a plurality of color components of the image data into a plurality of plane image data based on the Bayer arrangement, a sum plane generation unit configured to generate plane image data of a sum plane by performing addition of components of the same color out of the plurality of plane image data, a difference plane generation unit configured to generate plane image data of a difference plane by performing subtraction of the components of the same color, and an encoding unit configured to compression-encode the plane image data, the encoding unit compression-encoding the plane image data of the sum plane and the difference plane for the plane image data of the components of the same color.

15 Claims, 15 Drawing Sheets

(56) References Cited

U.S. PATENT DOCUMENTS

| | | | |
|---|---|---|---|
| 2008/0162421 A1* | 7/2008 | Brooks | G06F 17/3025 |
| 2010/0026574 A1* | 2/2010 | Pozgay | H01Q 3/26 |
| | | | 342/371 |
| 2013/0016249 A1* | 1/2013 | Mine | H04N 5/2351 |
| | | | 348/223.1 |
| 2013/0300893 A1* | 11/2013 | Takada | H04N 19/635 |
| | | | 348/223.1 |
| 2016/0090693 A1* | 3/2016 | Eagles | D21F 7/083 |
| | | | 162/348 |
| 2016/0112722 A1* | 4/2016 | Rowny | H04N 9/04 |
| | | | 348/231.2 |
| 2017/0118476 A1* | 4/2017 | Sakamoto | H04N 19/124 |
| 2017/0118477 A1* | 4/2017 | Suzuki | H04N 9/64 |

\* cited by examiner

COLOR SEPARATION

DIVISION COUNT = 2
(L: LOW FREQUENCY BAND, H: HIGH FREQUENCY BAND)

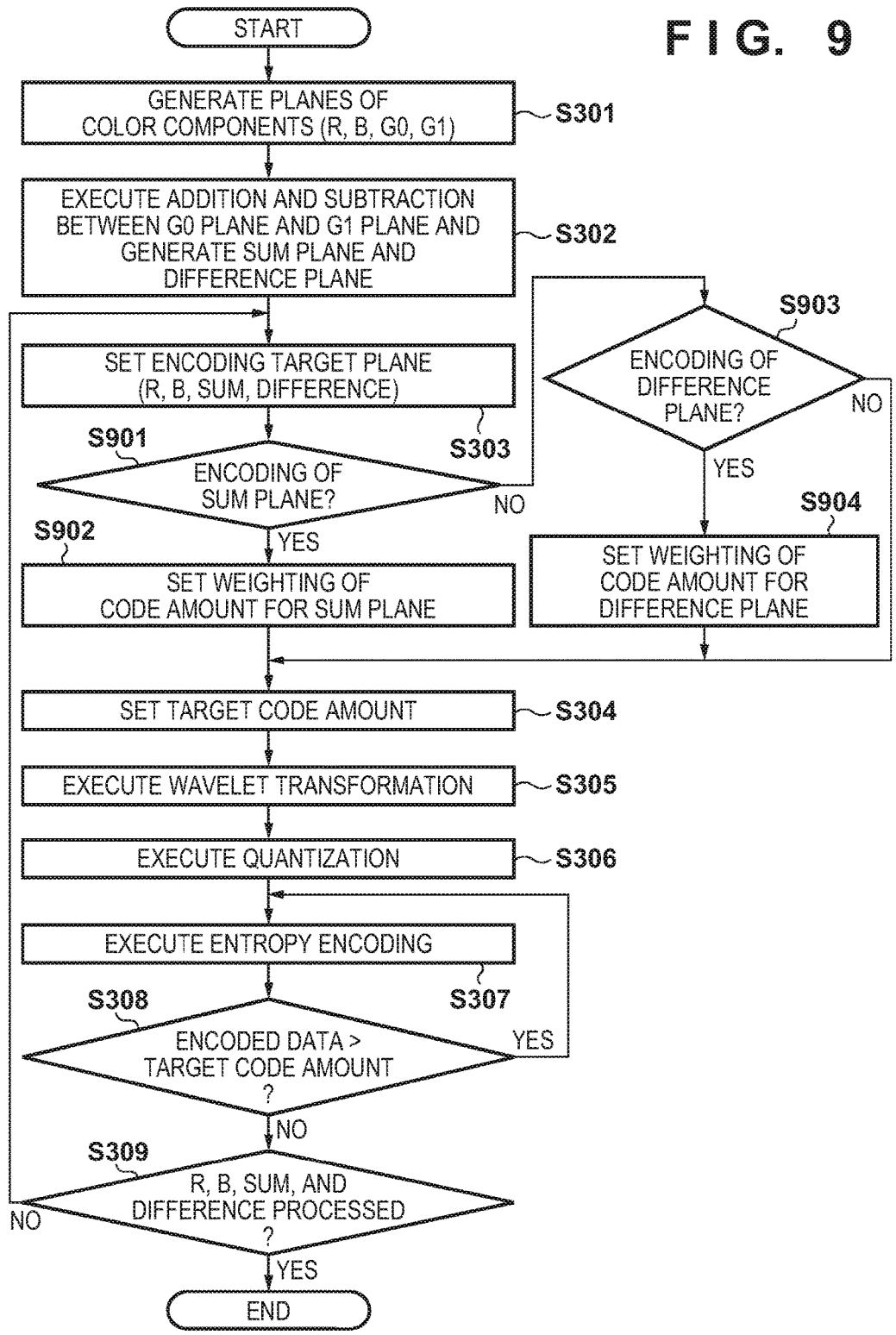

IMAGE PROCESSING APPARATUS, IMAGE CAPTURING APPARATUS, IMAGE PROCESSING METHOD, AND NON-TRANSITORY COMPUTER READABLE STORAGE MEDIUM

BACKGROUND OF THE INVENTION

Field of the Invention

The invention relates to an image processing apparatus, an image capturing apparatus, an image processing method, and a non-transitory computer-readable storage medium.

Description of the Related Art

A recent image capturing apparatus such as a digital camera or a digital camcorder employs a CCD sensor or a CMOS sensor as an image sensor. These sensors are mainly formed from a single CCD or CMOS sensor. A color filter array (to be referred to as a CFA hereinafter) on the sensor surface acquires the pixel value of one color component (for example, one of R, G, and B components) in one pixel. When the CFA is used, for example, image data (to be referred to as RAW data hereinafter) of a Bayer arrangement having a periodical pattern of R (red), G0 (green), B (blue), and G1 (green) as shown in FIG. 2A can be obtained. A human vision has high sensitivity to a luminance component. Hence, in RAW data shown in FIG. 2A, a green component including a large amount of luminance component is assigned pixels in a number twice larger than a red component or a blue component. Since the RAW data has only the information of one color component in one pixel, as described above, the pixel values of red, blue, and green components need to be generated for one pixel using de-mosaicing. De-mosaicing is processing of collecting short color information from the peripheral pixels of each pixel and giving the information to the pixel, thereby compensating for color information and creating a full-color image.

In general, an image capturing apparatus encodes and records image data of RGB signals obtained by de-mosaicing or image data of YUV signals obtained by converting RGB signals. On the other hand, a method of encoding and recording RAW data before de-mosaicing is also recently proposed.

For example, Japanese Patent Laid-Open No. 2003-125209 discloses a method of separating RAW data into signal components (R, G0, B, and G1) to put the four components (planes) in order and then encoding the data.

However, when RAW data is separated into the color signal components, the G0 component and the G1 component, which are originally located at close pixel positions and have a high correlation because of the same color, are separated into different planes. Hence, the pixel values of adjacent pixels may be discrete in each of G0 and G1, and the encoding efficiency may consequently be lowered.

SUMMARY OF THE INVENTION

The invention provides a technique of enabling efficient RAW data encoding.

One aspect of embodiments of the invention relates to an image processing apparatus for encoding image data of a Bayer arrangement, comprising, a color separation unit configured to separate a plurality of color components of the image data into a plurality of plane image data based on the Bayer arrangement, a sum plane generation unit configured to generate plane image data of a sum plane by performing addition of components of the same color out of the plurality of plane image data, a difference plane generation unit configured to generate plane image data of a difference plane by performing subtraction of the components of the same color, and an encoding unit configured to compression-encode the plane image data, the encoding unit compression-encoding the plane image data of the sum plane and the difference plane for the plane image data of the components of the same color.

Further features of the invention will become apparent from the following description of exemplary embodiments (with reference to the attached drawings).

BRIEF DESCRIPTION OF THE DRAWINGS

FIG. 9 is a flowchart showing an example of an encoding operation according to the second embodiment of the invention;

DESCRIPTION OF THE EMBODIMENTS

Hereinafter, embodiments of the invention will be described in detail with reference to the accompanying drawings. Note that the invention is not limited to the following embodiments. That is, the following embodiments are not intended to limit the scope of the appended claims, and that not all the combinations of features described in the embodiments are necessarily essential to achieve the invention.

Each functional block to be described in the embodiments need not always be individual hardware. That is, for example, the functions of several functional blocks may be executed by a piece of hardware. The function of one functional block or the functions of a plurality of functional blocks may be executed by the cooperative operation of several pieces of hardware. The function of each functional block may be executed by a computer program loaded onto a memory by a CPU.

First Embodiment

The first embodiment of the invention will be described below. In this embodiment, an image capturing apparatus such as a digital camera will be described as an example. However, any apparatus can be used as long as it can compress RAW image data of a Bayer arrangement. For example, a communication apparatus or an information processing apparatus such as a portable telephone, a smartphone, a tablet information terminal, a notebook information terminal, or a computer may be used. An image capturing apparatus corresponding to the embodiment of the invention will be described below.

Figure 1A:
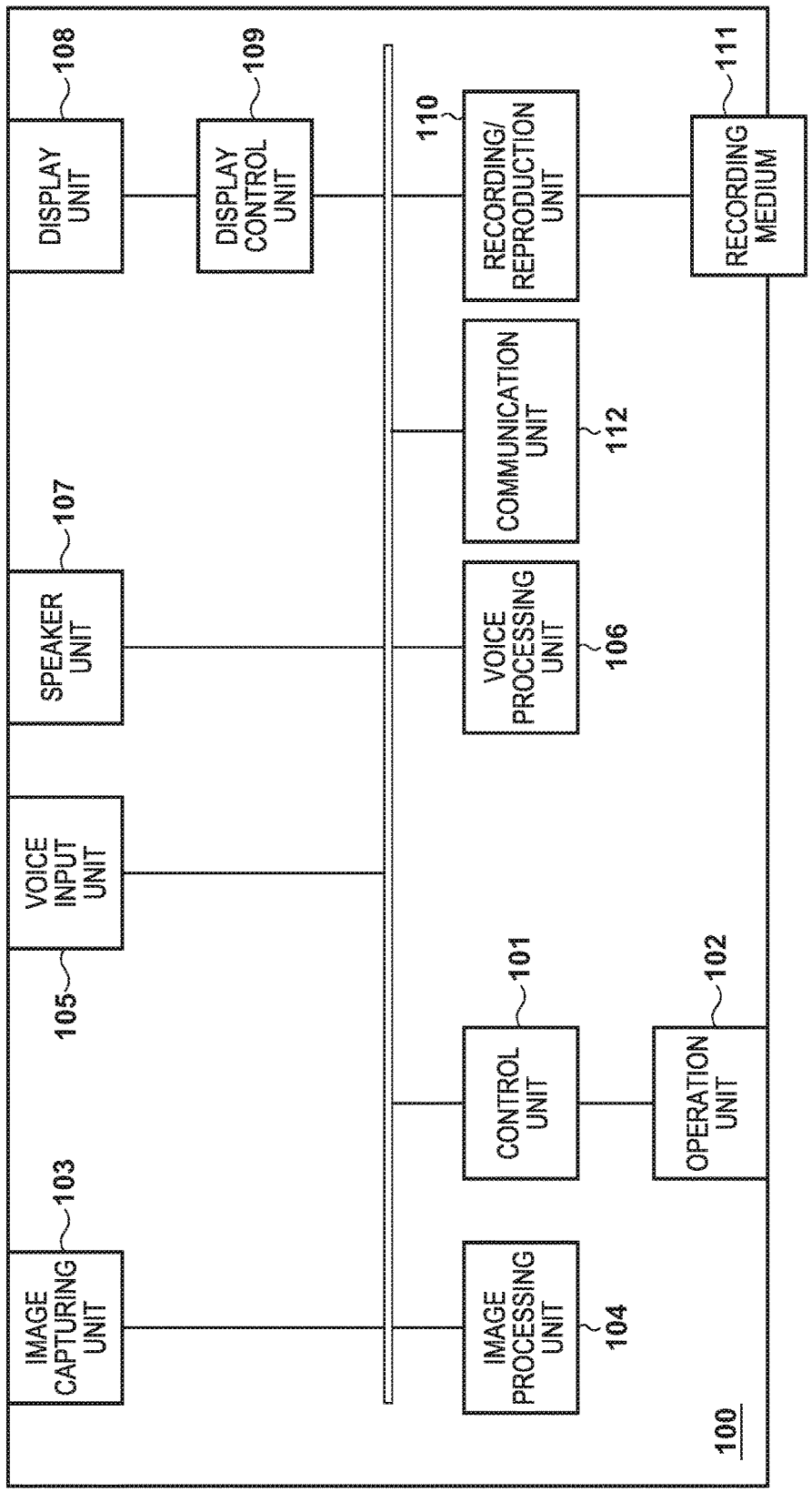
FIG. 1A is a block diagram showing an example of the arrangement of an image capturing apparatus according to an embodiment of the invention.

The main parts of an image capturing apparatus 100 according to this embodiment will be described first with reference to FIG. 1A. Referring to FIG. 1A, a control unit 101 includes, for example, a CPU (MPU), a memory (a DRAM or an SRAM), a nonvolatile memory (EEPROM), and the like. The control unit 101 executes various kinds of processes (programs), and controls each block of the image capturing apparatus 100 or controls data transfer between the blocks. The control unit 101 also controls each block of the image capturing apparatus 100 in accordance with an operation signal from an operation unit 102 that accepts an operation from a user.

The operation unit 102 includes, for example, switches configured to input various kinds of operations associated with shooting, such as a power button, a still image recording button, a moving image recording start button, a zoom adjustment button, and an auto focus button. The operation unit 102 also includes a menu display button, a determination button, cursor keys, a pointing device, a touch panel, and the like. When the user operates the key or button, the operation unit 102 transmits an operation signal to the control unit 101. Note that the image capturing apparatus 100 includes an electrically erasable and programmable nonvolatile memory (not shown) which stores constants, programs, and the like for the operation of the control unit 101.

An image capturing unit 103 controls, by a stop, the light amount of an optical image (object image) of an object received via a lens, captures an image signal by the image sensor such as a CCD sensor or a CMOS sensor, performs analog/digital conversion, and transmits the image to an image processing unit 104. The image processing unit 104 processes the input digital image signal. The processed image data is stored in the nonvolatile memory (not shown) by the control unit 101. Detailed processing will be described later. Note that the image signal obtained by the image sensor is so-called RAW image data, which is RGB data of a Bayer arrangement.

A voice input unit 105 collects a voice around the image capturing apparatus 100 by, for example, an internal omnidirectional microphone or an external microphone connected via a voice input terminal, performs analog/digital conversion, and transmits the voice to a voice processing unit 106. The voice processing unit 106 performs processing associated with the voice such as optimization processing of the level of the input digital voice signal. The voice data processed by the voice processing unit 106 is stored in the nonvolatile memory (not shown) by the control unit 101.

The image data and the voice data processed by the image processing unit 104 and the voice processing unit 106 and stored in the nonvolatile memory (not shown) are transmitted to a recording/reproduction unit 110 by the control unit 101 and recorded in a recording medium 111. The recording medium 111 can be either a recording medium incorporated in the image capturing apparatus or a detachable recording medium. The recording medium 111 need only be able to record a compressed image signal, a compressed voice signal, a voice signal, various kinds of data, and the like generated by the image capturing apparatus 100. For example, the recording medium 111 includes recording media of all formats such as a hard disk, an optical disk, a magnetooptical disk, a CD-R, a DVD-R, a magnetic tape, a nonvolatile semiconductor memory, and a flash memory.

The compressed image signal and the compressed voice signal recorded in the recording medium 111 are decoded by the image processing unit 104 and the voice processing unit 106. The image is displayed on a display unit 108 via a display control unit 109. The voice is output from a speaker unit 107.

A communication unit 112 performs communication between the image capturing apparatus 100 and an external apparatus, and, for example, transmits or receives data such as a voice signal, an image signal, a compressed voice signal, or a compressed image signal. The communication unit 112 also transmits or receives control signals concerning shooting such as shooting start and end commands and other information. The communication unit 112 is, for example, a wireless communication module such as an infrared communication module, a Bluetooth® communication module, a wireless LAN communication module, a wireless USB, or a GPS receiver.

Figure 1B:
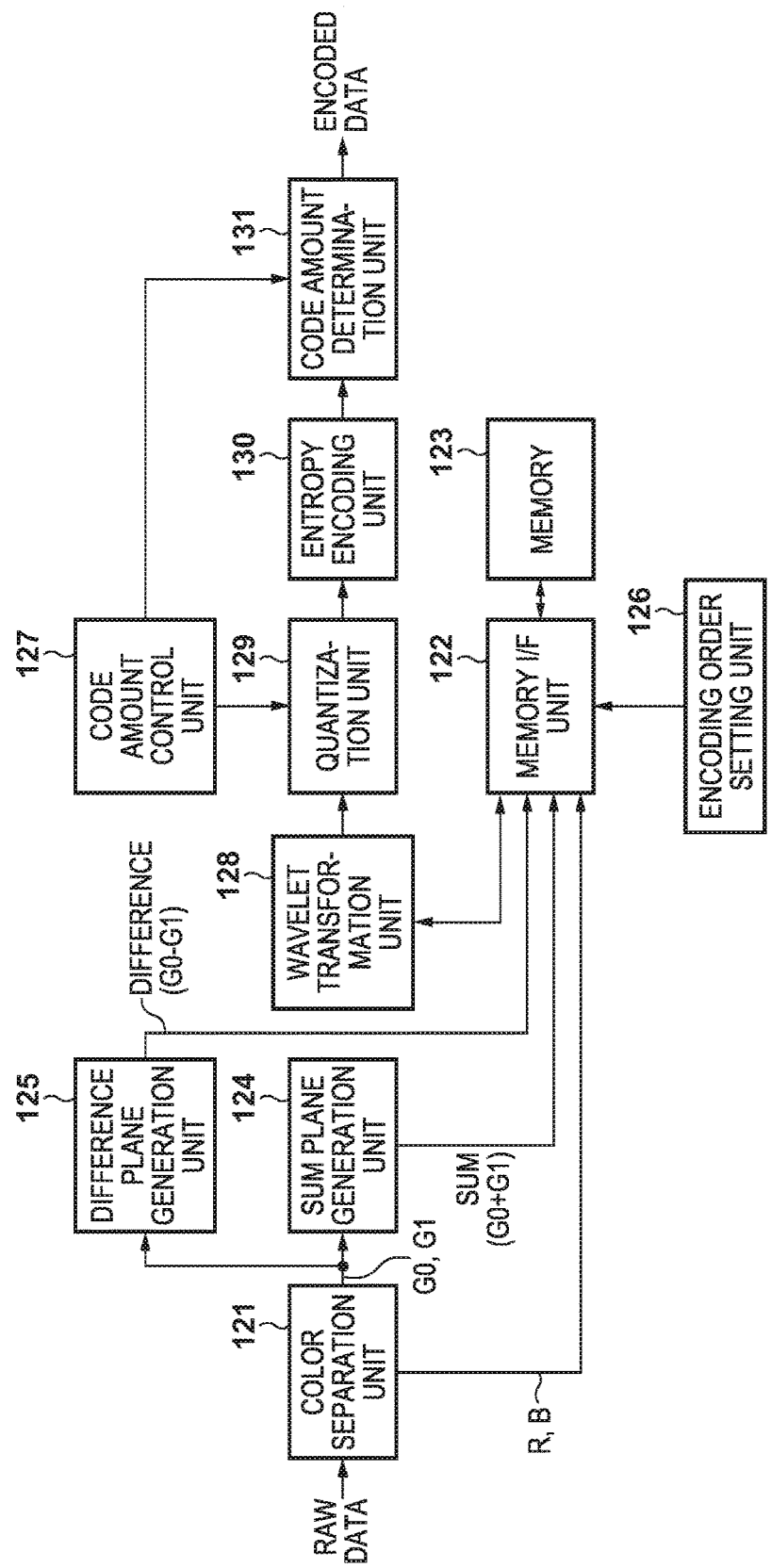
FIG. 1B is a block diagram showing an example of the arrangement of an image processing unit according to the embodiment of the invention.

The arrangement and processing procedure of the image processing unit 104 corresponding to this embodiment will be described next with reference to the block diagram of FIG. 1B.

The image processing unit 104 according to this embodiment functions as an encoding unit, and includes a color separation unit 121, a memory I/F unit 122, a memory 123, a sum plane generation unit 124, a difference plane generation unit 125, an encoding order setting unit 126, a code amount control unit 127, a wavelet transformation unit 128, a quantization unit 129, an entropy encoding unit 130, and a code amount determination unit 131.

Figure 4:
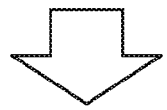
FIG. 4 is a view schematically showing color separation of the RAW data of the Bayer arrangement and a plane formation method.

The color separation unit 121 separates RAW data of a Bayer arrangement into independent plane image data (to be simple referred to as a "plane" hereinafter) for each of R, G0, G1, and B pixels, as shown in FIG. 4. Out of the planes of the respective color components generated by the color separation unit 121, the R and B planes are written in the memory 123 via the memory I/F unit 122, the G0 and G1 planes are input to the sum plane generation unit 124 and the difference plane generation unit 125. The memory I/F unit 122 arbitrates a memory access request from each processing unit and controls read/write for the memory 123. The memory 123 is a storage area used to hold various kinds of data output from each processing unit.

Figure 5:
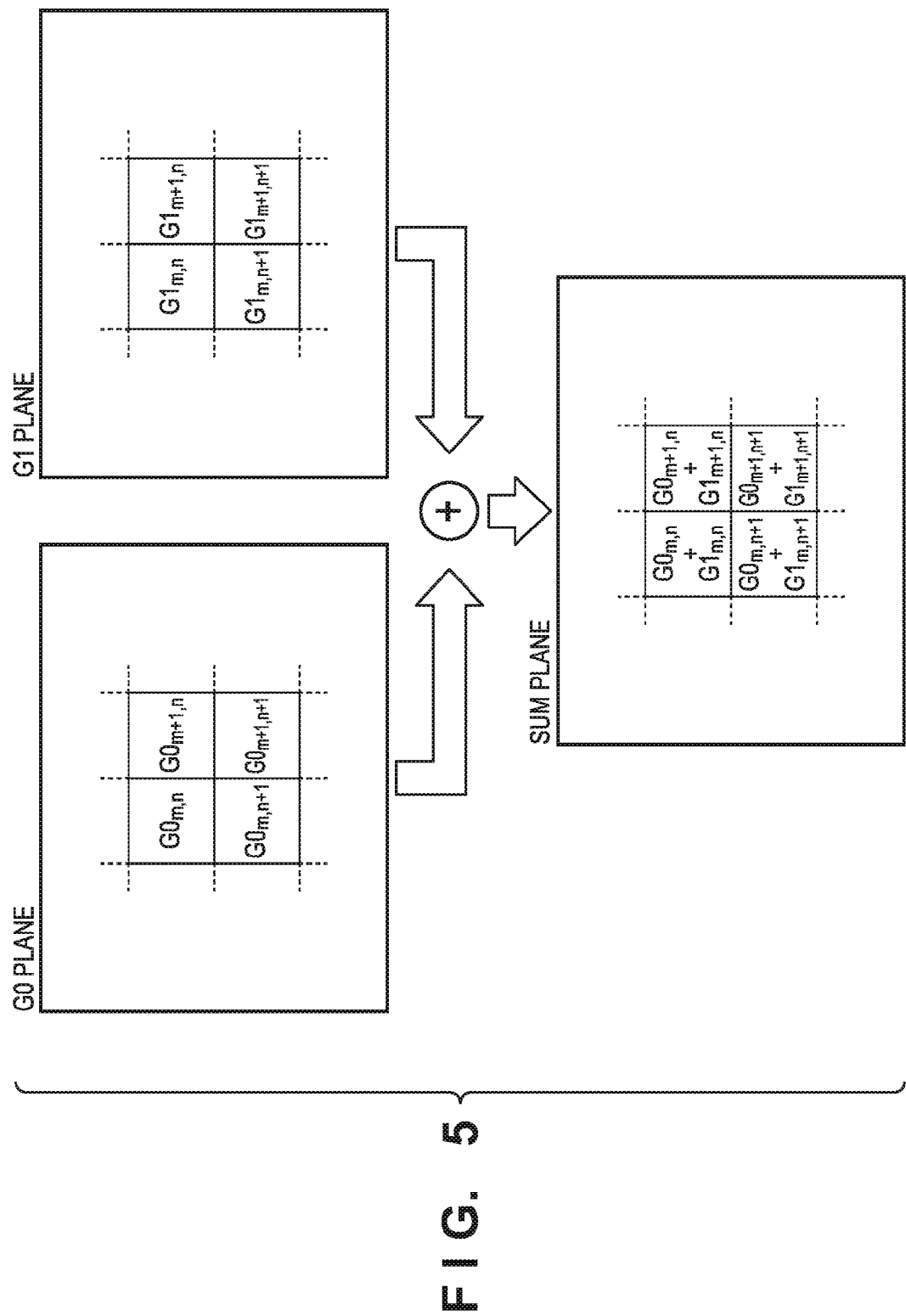
FIG. 5 is an explanatory view showing an example of a sum plane generation method according to the embodiment of the invention.
Figure 6:
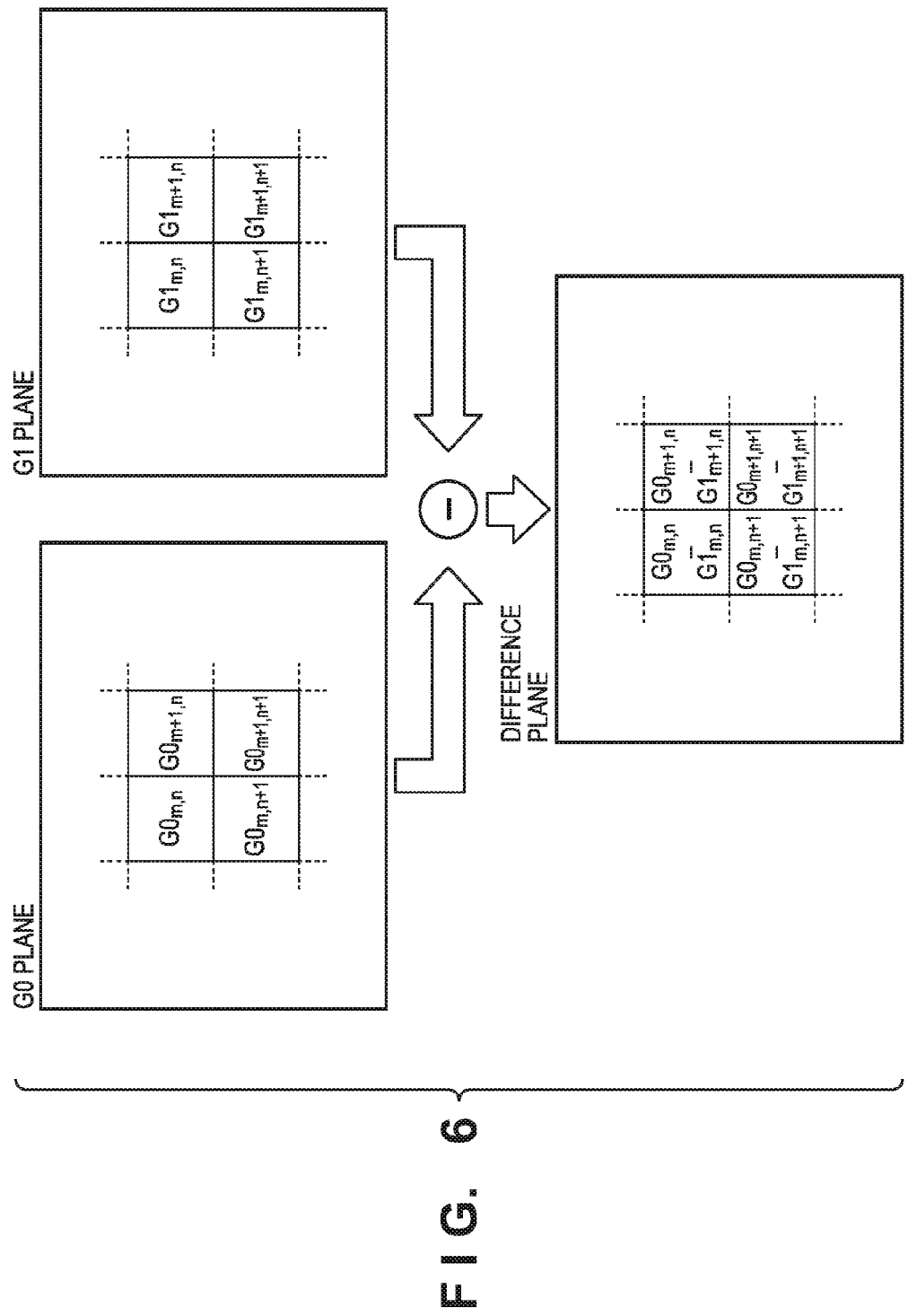
FIG. 6 is an explanatory view showing an example of a difference plane generation method according to the embodiment of the invention.

As shown in FIG. 5, the sum plane generation unit 124 performs addition of the pixel values at the same positions in the two input planes to obtain the pixel values of a sum plane to be output. The sum plane generated by the sum plane generation unit 124 is written in the memory 123 via the memory I/F unit 122. As shown in FIG. 6, the difference plane generation unit 125 performs subtraction between the pixel values at the same positions in the two input planes to obtain the pixel values of a difference plane to be output. The difference plane generated by the difference plane generation unit 125 is written in the memory 123 via the memory I/F unit 122.

The encoding order setting unit 126 sets the order of encoding of the R, B, sum, and difference planes, and controls the memory I/F unit 122 such that the planes are read out from the memory 123 in the set order. The code amount control unit 127 sets the target code amount of encoded data of each plane in the quantization unit 129 and the code amount determination unit 131.

Figure 7:
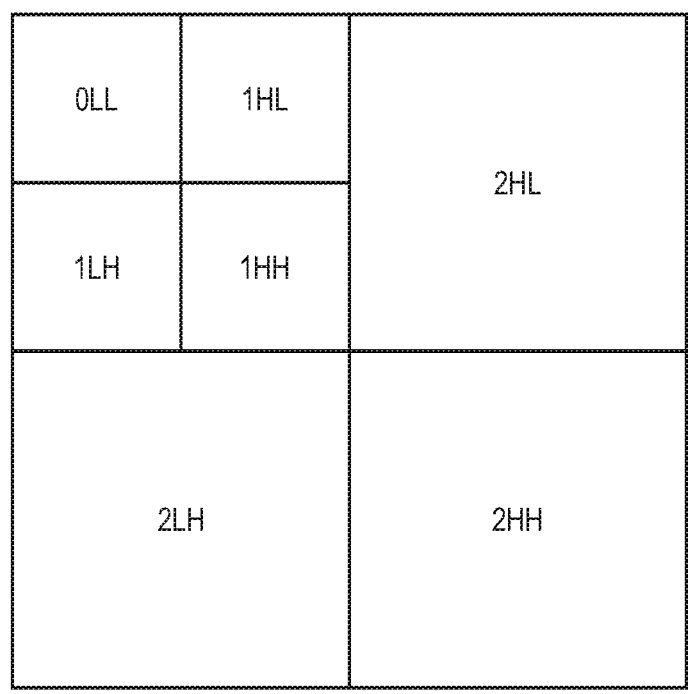
FIG. 7 is a view showing a sub-band image after wavelet transformation.

The wavelet transformation unit 128 executes wavelet transformation for the R, B, sum, and difference planes read out from the memory 123 via the memory I/F unit 122, and then sends a transformation coefficient generated in the format of a sub-band image to the quantization unit 129. Wavelet transformation is conversion processing of converting a processing target image into a hierarchical image (sub-band) for each frequency band. More specifically, wavelet transformation indicates processing of dividing an image into low-frequency components and high-frequency components by applying low-pass filter processing and high-pass filter processing to the entire image. A transformation coefficient after the wavelet transformation takes the format of a sub-band image as shown in FIG. 7. In wavelet transformation, only a sub-band of a low frequency band is repetitively divided every time the division count is increased. This processing is used to raise the encoding efficiency using a characteristic representing that most of the energy of an image concentrates to a low frequency band.

A sub-band image will be described next with reference to FIG. 7. FIG. 7 shows an example of a sub-band image generated by executing wavelet transformation twice, and indicates that the image is formed from a total of seven sub-bands. Here, L indicates a low frequency band, and H indicates a high frequency band. A number before L or H represents a layer level. For example, 1HL represents a sub-band image of layer level=1, which includes a high-frequency component in the horizontal direction, and a low-frequency component in the vertical direction. The upper left sub-band includes many low-frequency components, and the energy of the image concentrates there.

The quantization unit 129 executes quantization for the sub-band image sent from the wavelet transformation unit 128, and sends the image to the entropy encoding unit 130. Note that a parameter used when executing the quantization is set based on the target code amount set by the code amount control unit 127. The entropy encoding unit 130 entropy-encodes the sub-band image quantized by the quantization unit 129, thereby generating encoded data. The generated encoded data is sent to the code amount determination unit 131. As the entropy encoding executed by the entropy encoding unit 130, for example, EBCOT (Embedded Block Coding with Optimized Truncation) employed in JPEG 2000 is used. The code amount determination unit 131 determines whether the encoded data sent from the entropy encoding unit 130 is larger than the target code amount set by the code amount control unit 127.

In this embodiment, if the encoded data is larger than the target code amount, the code amount determination unit 131 further compresses the encoded data such that the size of the encoded data meets the target code amount. As a method of further compressing the encoded data, for example, post quantization that is one of the functions of JPEG 2000 is used. Post quantization is a method of achieving the target code amount by discarding the completed encoded data from the lower bit using the fact that EBCOT of entropy encoding used in JPEG 2000 encodes a transformation coefficient in each bit plane.

Encoding processing for one frame of RAW data according to this embodiment will be described next with reference to the flowchart of FIG. 3. The flowchart of FIG. 3 can be implemented when, for example, a processor functioning as the image processing unit 104 loads a program stored in a memory (ROM) to a work memory (RAM) and executes it (this also applies to flowcharts corresponding to FIG. 3 in other embodiments).

In step S301, the color separation unit 121 separates R, B, G0, and G1 components from RAW data and forms planes of the color components. After the plane of each color component is formed, a sum plane and a difference plane are generated in step S302. More specifically, the sum plane generation unit 124 executes addition of the G0 plane and the G1 plane and generates a sum plane. In addition, the difference plane generation unit 125 executes subtraction between the G0 plane and the G1 plane and generates a difference plane. Note that the R and B planes and the sum and difference planes are generated and then written in the memory 123 via the memory I/F unit 122.

After the R, B, sum, and difference planes are generated, in step S303, the encoding order setting unit 126 sets the plane for which encoding processing should be executed first. Here, for example, the order is set as R, B, sum, and difference. However, the order is not limited to this. After the encoding target plane is set, the code amount control unit 127 sets a target code amount for the selected plane in step S304. In this embodiment, the code amount control unit 127 sets a value obtained by equally dividing the target code amount of the entire RAW data by the number of planes as the target code amount of each plane. That is, the target code amounts of the R, B, sum, and difference planes are set to almost the same code amount.

After the target code amounts are set, in step S305, the wavelet transformation unit 128 reads out the selected plane from the memory 123 via the memory I/F unit 122, and executes wavelet transformation. In step S306, the quantization unit 129 quantizes the wavelet-transformed image. Note that a parameter used for the quantization is decided based on the target code amount set by the code amount control unit 127.

After the quantization, in step S307, the entropy encoding unit 130 compression-encodes the sub-band image and outputs encoded data. When the compression-encoding ends, in step S308, the code amount determination unit 131 determines whether the code amount of the output encoded data is larger than the target code amount set by the code amount control unit 127. If the code amount is larger than the target code amount, the process returns to step S307, and the entropy encoding unit 130 further compresses the encoded data to meet the target code amount. If the code amount is equal to or smaller than the target code amount, it is determined in step S309 whether the encoding is executed for all of the R, B, sum, and difference planes. If an unprocessed plane remains, the process returns to step S303 to continue the processing. On the other hand, if all planes are processed, the encoding processing ends.

Note that in this embodiment, an example of processing on a frame basis has been described. However, the image may be divided into an arbitrary size, and the above-described processing may be executed independently for each divided image. In this embodiment, an example in which wavelet transformation is used has been described. However, a discrete cosine transform used in an encoding technique such as JPEG, JPEG XR, or MPEG-4 AVC may be used instead. In addition, the entropy encoding may be changed to Huffman coding.

Figures 2A, 2B:
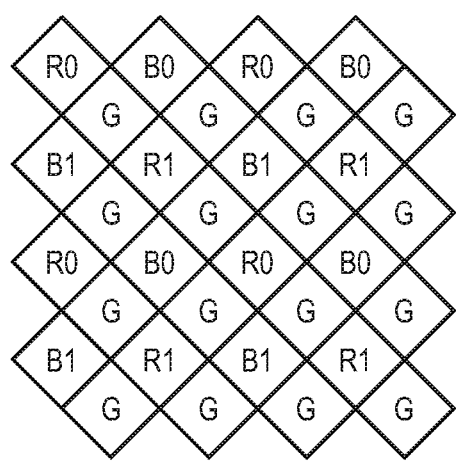
FIG. 2A is a view showing a Bayer arrangement.
FIG. 2B is a view showing a double density Bayer arrangement.
Figure 8A:
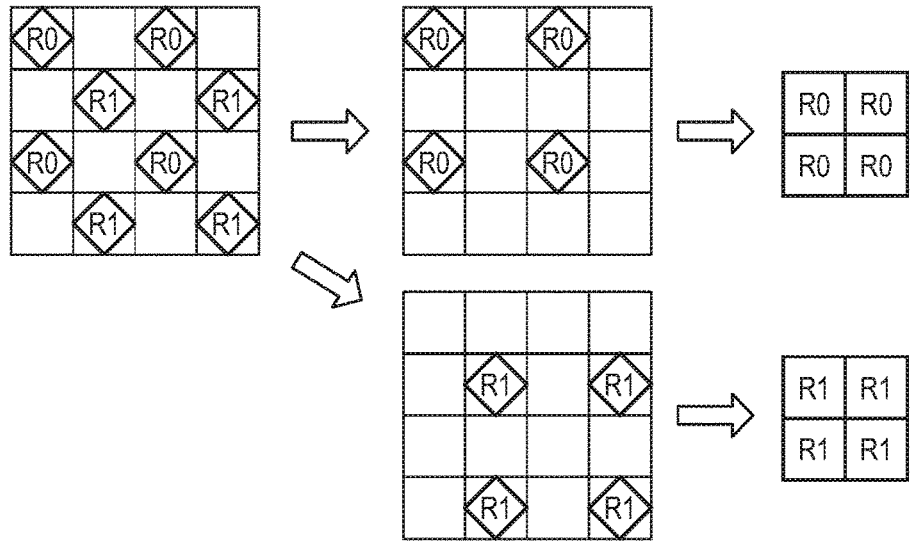
FIGS. 8A to 8C are views showing handling of pixel values for each color component of double density Bayer.
Figure 8B:
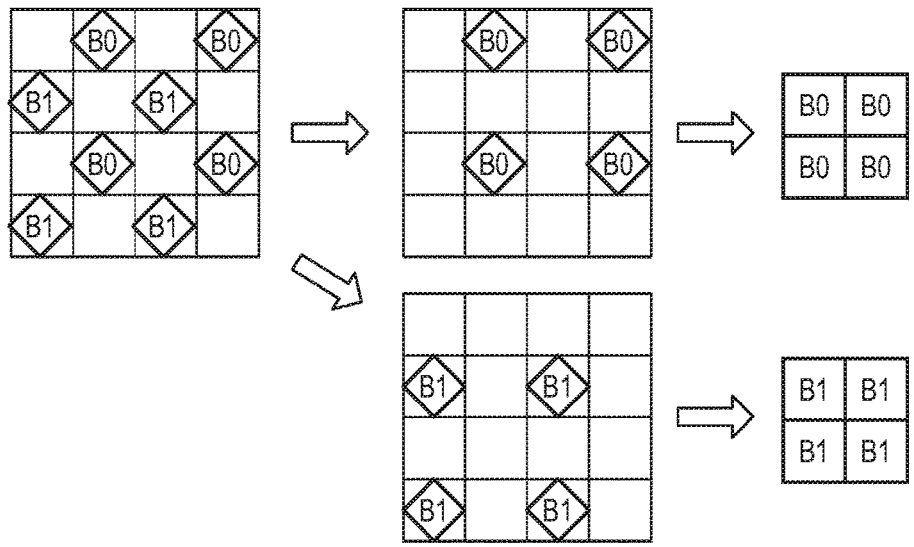
Figure 8C:
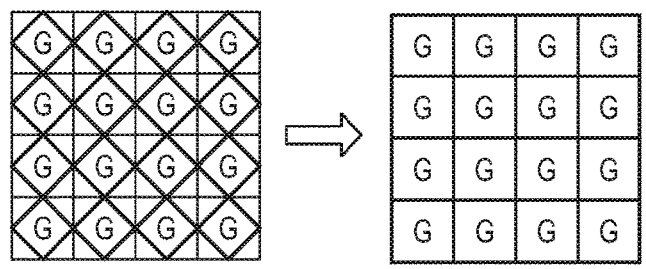

Note that in this embodiment, pixel data of a Bayer arrangement as shown in FIG. 2A is handled. However, a double density Bayer arrangement as shown in FIG. 2B may be used. The double density Bayer arrangement is a pixel arrangement including R0, R1, B0, B1, and G components, in which the pixel density of the Bayer arrangement is doubled, and the pixels are arranged obliquely at 45°. In the double density Bayer arrangement, the number of pixels of the G component is twice larger than that of the R component (the sum of the R0 and R1 components) or the B component (the sum of the B0 and B1 components), like the Bayer arrangement. When encoding the double density Bayer arrangement, the planes of the R0, R1, B0, B1, and G components are generated, and a sum plane and a difference plane are generated from the R0 and R1 planes and from the B0 and B1 planes, thereby performing encoding processing for each plane, like the Bayer arrangement, as shown in FIGS. 8A to 8C.

Figure 3:
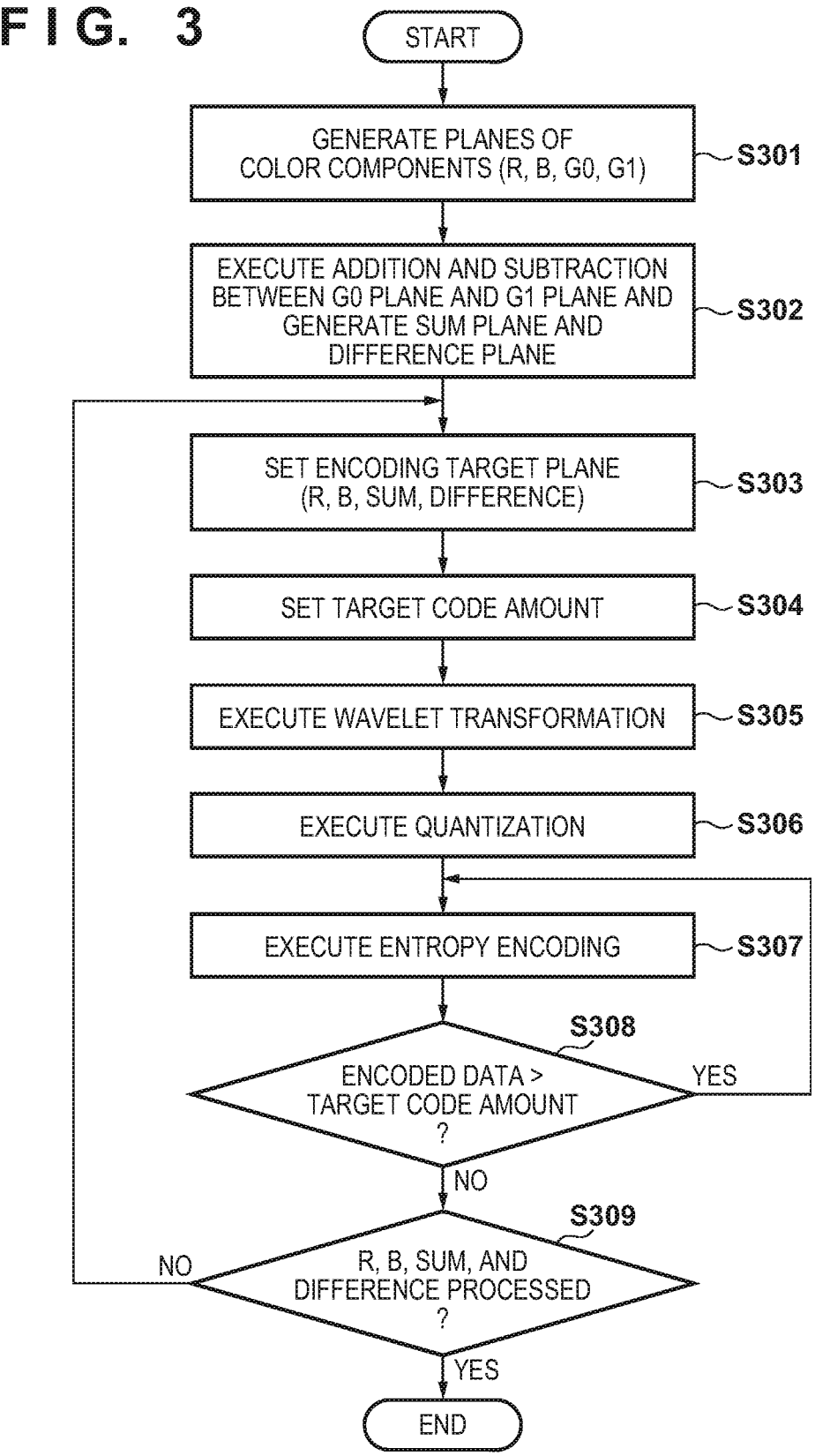
FIG. 3 is a flowchart showing an example of an encoding operation according to the first embodiment of the invention.

In this case, in the processing shown in FIG. 3, the planes of the R0, R1, B0, B1, and G components are generated in step S301. In step S302, a sum plane and a difference plane are generated from the R0 and R1 planes and from the B0 and B1 planes. After that, the processes of steps S303 to S309 are executed based on the G plane, the sum plane and the difference plane of the R components, and the sum plane and the difference plane of the B components.

As described above, according to this embodiment, the color components of the Bayer arrangement are separated into planes that are independent images. From the planes of the same color components, a sum plane is generated by addition, and a difference plane is generated by subtraction. That is, in the normal Bayer arrangement, a sum plane and a difference plane are generated from the G0 and G1 planes of the same green components. In the double density Bayer arrangement, a sum plane and a difference plane are generated from the R0 and R1 planes of the same red components and from the B0 and B1 planes of the same blue components. Here, since the addition is a low-pass filter operation, sum plane generation corresponds to processing of extracting a low-frequency component from the green component of RAW data using a low-pass filter. In addition, since the subtraction is a high-pass filter operation, difference plane generation corresponds to processing of extracting a high-frequency component from the green component of RAW data using a high-pass filter. For this reason, the low-frequency component and the high-frequency component of the green component of the RAW data are separated before encoding processing. It is therefore possible to reduce degradation of the frequency component division efficiency at the time of wavelet transformation and raise the compression efficiency of encoding processing. Note that the compression efficiency of encoding processing can be raised in a discrete cosine transform as well.

Note that in this embodiment, the basic target code amount is evenly assigned to the R, B, G0 and G1 planes. However, the ratio of code amounts assigned to the color components may be changed such that, for example, the code amounts of the R and B planes are decreased, and larger code amounts are assigned to the G0 and G1 planes.

Second Embodiment

An encoding method corresponding to the second embodiment of the invention will be described next. In this embodiment, an image capturing apparatus 100 and an image processing unit 104 functioning as an encoding unit have the same arrangements as those shown in FIGS. 1A and 1B of the first embodiment. As a characteristic feature of this embodiment, the code amount of a sum plane is set to be larger than the code amount of a difference plane considering that the sum plane corresponds to the low-frequency component of the green component of RAW data, and the difference plane corresponds to the high-frequency component, as described in the first embodiment.

An encoding operation according to this embodiment will be described below with reference to the flowchart of FIG. 9. Note that the same step numbers as in the first embodiment denote the same processes, and only a brief description thereof will be made here. First, as in the first embodiment, in steps S301 to S303, the planes of R, B, G0, and G1 components are formed, and after a sum plane and a difference plane are generated using the G0 and G1 planes, one of the R, B, sum, and difference planes for which encoding processing should be executed is set. In this embodiment as well, for example, the order is set as R, B, sum, and difference. Next, in step S901, it is determined whether the encoding order setting unit 126 sets the sum plane as the encoding target. If the sum plane is the encoding target, in step S902, a code amount control unit 127 sets the weighting of the target code amount such that the code amount of the sum plane becomes larger than that of the difference plane.

In this embodiment, as a method of adding a weight to the target code amount, a method of increasing the basic target code amount (for example, a value obtained by equally dividing the target code amount of the entire RAW data by the number of planes) separately set by the code amount control unit 127 by an arbitrarily set parameter X (%) is used. As a method of setting the target code amount of the sum plane based on the weighting, for example, a method based on $$T'=(100+X)T/100 \qquad (1)$$

is used, where T is the basic target code amount, and T' is the weighted target code amount.

For example, when X is set to 15, the target code amount of the sum plane is larger than the basic target code amount by 15%. However, when the target code amount of the sum plane is increased, the target code amount of the entire RAW data increases. Hence, in this embodiment, the target code amount of the difference plane is decreased in proportion to the increase in the target code amount of the sum plane. More specifically, in step S903, it is determined whether the encoding order setting unit 126 sets the difference plane as the encoding target. If the difference plane is the encoding target, in step S904, the code amount control unit 127 sets the weighting such that the target code amount of the difference plane becomes smaller than the basic target code amount by X %. As a method of setting the target code amount of the difference plane based on the weighting, for example, a method based on $$T'=(100-X)T/100 \qquad (2)$$

is used, where T is the basic target code amount, and T' is the weighted target code amount.

The target code amount of the difference plane is thus weighted such that the code amount of the difference plane decreases in proportion to the increase in the code amount of the sum plane, thereby suppressing an increased in the code amount of the entire RAW data. If the encoding target plane set by the encoding order setting unit 126 is neither the sum plane nor the difference plane (that is, the R or B plane) ("NO" in both of steps S901 and S903), the code amount control unit 127 directly sets the basic target code amount. Hence, the weighting is not set. After the code amount control unit 127 sets, in step S304, the target code amount on which the weighting for each plane is reflected, the processes of steps S305 to S309 are performed as in the first embodiment.

Note that in this embodiment, an example of processing on a frame basis has been described. However, the image may be divided into an arbitrary size, and the above-described processing may be executed independently for each divided image. In this embodiment, an example in which wavelet transformation is used has been described. However, a discrete cosine transform used in an encoding technique such as JPEG, JPEG XR, or MPEG-4 AVC may be used instead. In addition, the entropy encoding may be changed to Huffman coding.

Note that in this embodiment, pixel data of a Bayer arrangement as shown in FIG. 2A is handled. However, a double density Bayer arrangement as shown in FIG. 2B or FIGS. 8A to 8C may be used. In this case, after a sum plane and a difference plane are generated from the R0 and R1 planes and from the B0 and B1 planes, the target code amount of the sum plane can be set to be larger than that of the difference plane.

As described above, according to this embodiment, the sum plane is regarded as more important than the other planes and assigned a large code amount, thereby suppressing degradation of the low-frequency components held by the green components of the RAW data. A low-frequency component of an image has a great influence on image quality. The luminance component of an image includes a larger amount of green components than the red and blue components. Hence, when this embodiment is applied, the green components of the RAW data and, by extension, the low-frequency components of the luminance of the image can be maintained, and degradation of image quality can be suppressed. Note that in this embodiment as well, the basic target code amount is evenly assigned to the R, B, G0 and G1 planes. However, the ratio of code amounts assigned to the color components may be changed such that, for example, the code amounts of the R and B planes are decreased, and larger code amounts are assigned to the G0 and G1 planes.

Third Embodiment

An encoding method corresponding to the third embodiment of the invention will be described next. In this embodiment, an image capturing apparatus 100 and an image processing unit 104 functioning as an encoding unit have the same arrangements as those shown in FIGS. 1A and 1B of the first embodiment. In this embodiment, a method that exploits the feature of wavelet transformation upon weighting the target code amounts of a sum plane and a difference plane described in the second embodiment will be described.

Figure 10:
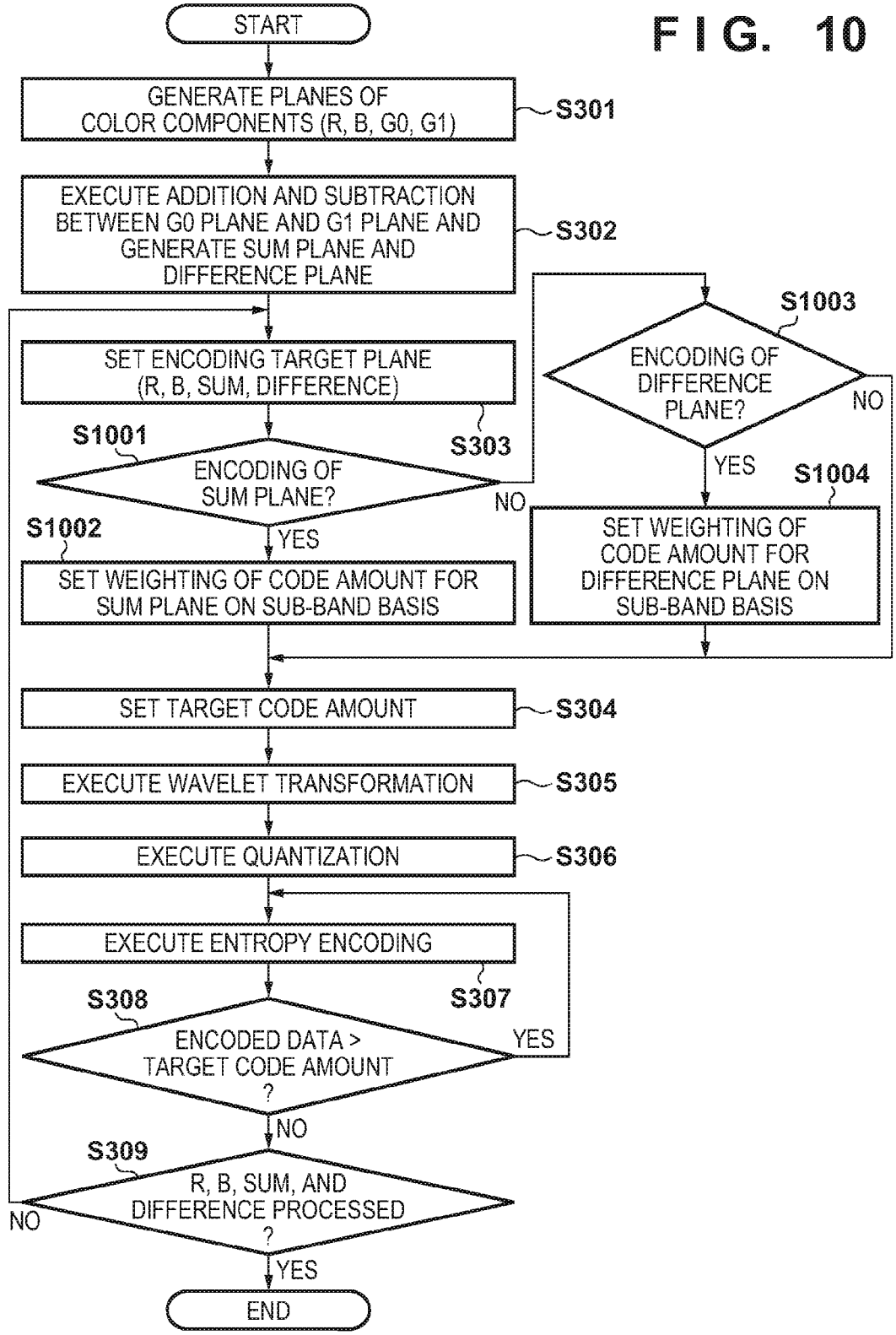
FIG. 10 is a flowchart showing an example of an encoding operation according to the third embodiment of the invention.

An encoding operation according to this embodiment will be described below with reference to the flowchart of FIG. 10. Note that the same step numbers as in the first embodiment denote the same processes, and only a brief description thereof will be made here.

First, as in the first embodiment, in steps S301 to S303, the planes of R, B, G0, and G1 components are formed, and after a sum plane and a difference plane are generated using the G0 and G1 planes, one of the R, B, sum, and difference planes for which encoding processing should be executed is set. In this embodiment as well, for example, the order is set as R, B, sum, and difference. Next, in step S1001, it is determined whether an encoding order setting unit 126 sets the sum plane as the encoding target plane. If the sum plane is the encoding target, in step S1002, a code amount control unit 127 adds a weight set for the sum plane to the target code amount. It is also determined whether the encoding order setting unit 126 sets the difference plane as the encoding target plane. If the difference plane is the encoding target, in step S1004, the code amount control unit 127 adds a weight set for the difference plane to the target code amount.

In this embodiment, using the fact that the frequency components are divided for each sub-band by wavelet transformation, the code amount control unit 127 sets the target code amounts of the sum plane and the difference plane for each sub-band. Details of a method of setting a target code amount will be described later with reference to FIG. 11. If the encoding target plane set by the encoding order setting unit 126 is neither the sum plane nor the difference plane (R or B plane), the basic target code amount (for example, a value obtained by equally dividing the target code amount of the entire RAW data by the number of planes) is directly set. After the code amount control unit 127 sets, in step S304, the target code amount on which the weighting for each sub-band is reflected, the processes of steps S305 to S309 are performed as in the first embodiment.

Figure 11:
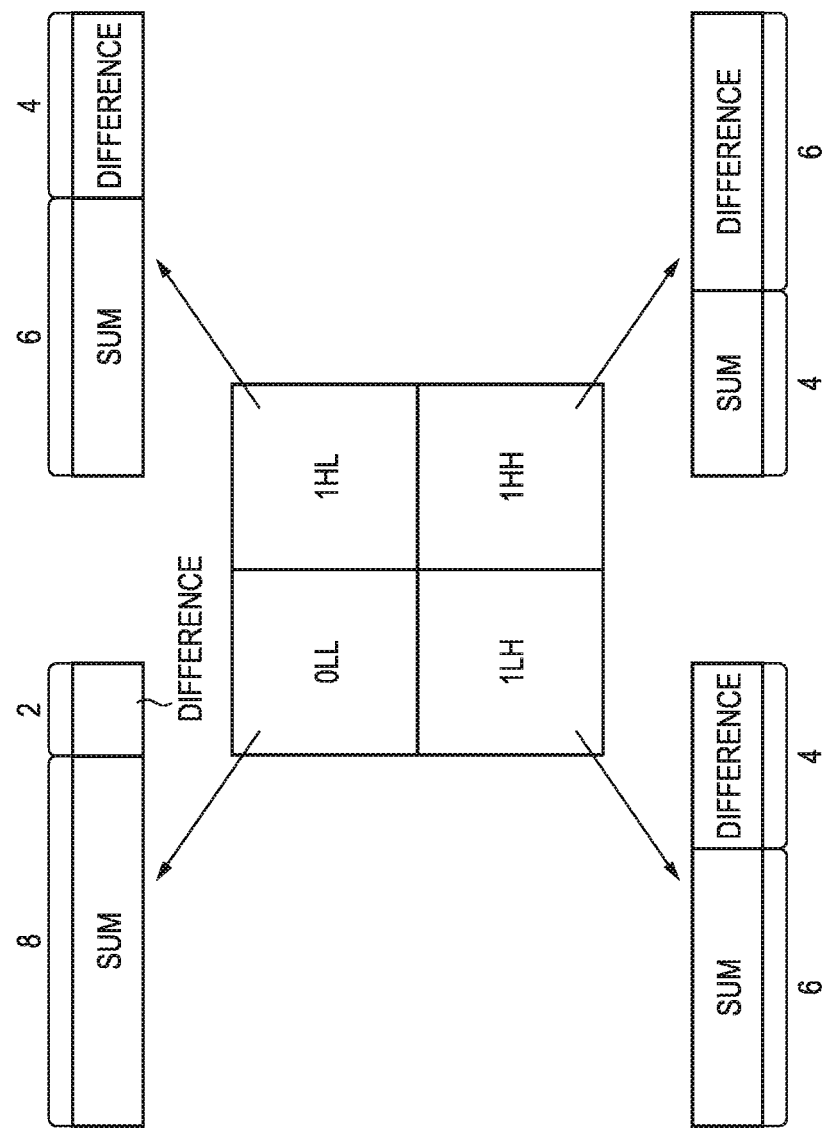
FIG. 11 is a view showing an example of the weighting of the target code amounts of a sum plane and a difference plane for each sub-band according to the third embodiment of the invention.

Weighting of the target code amounts of the sum plane and the difference plane for each sub-band according to this embodiment will be described next. FIG. 11 shows an example of the weighting of the target code amounts of the sum plane and the difference plane. In the sub-band image shown in FIG. 11, the division count by wavelet transformation is 1, for the descriptive convenience. The objects at the four corners in FIG. 11 represent the code amount ratio between the sum plane and the difference plane for each sub-band. Since the sum plane corresponds to the low frequency band of the green component of the RAW data, a larger amount of energy of the image concentrates to the sub-band in the low frequency band as the result of wavelet transformation. Hence, when the ratio of the code amount of the sum plane is made larger than that of the difference plane in the sub-band in the low frequency band, more energy of the image can be left, and degradation of image quality can be suppressed.

On the other hand, when the information in the low frequency band may be used, the outline of the image is assumed to be blurred. Since the difference plane corresponds to the high frequency band of the green component of the RAW data, the ratio of the code amount of the difference plane is made equal to or larger than the sum plane in the sub-band in the high frequency band, thereby leaving the information in the high frequency band and maintaining the outline of the image. When assigning the code amounts of the sum plane and the difference plane, the sum of the target code amounts of the sum plane and the difference plane is set for each sub-band. In this embodiment, a value obtained by further equally dividing the target code amount of two planes, which is calculated from the target code amount of the entire RAW data, by the number of sub-bands is set as the sum of the target code amounts of the sum plane and the difference plane. For example, if the target code amount of the entire RAW data is 800 KB, and the number of sub-bands is 4, the target code amount of two planes is 400 KB. In addition, the sum of the code amounts of the sum plane and the difference plane for each sub-band is set to 100 KB.

Assignment of the code amounts of the sum plane and the difference plane for each sub-band will be described assuming a case in which the sum of the code amounts of the sum plane and the difference plane for each sub-band is 100 KB, the number of sub-bands is 4, and the ratio shown in FIG. 11 is used. In the 0LL band, since the ratio of the sum plane to the difference plane is 8:2, 80 KB is assigned to the sum plane, and 20 KB is assigned to the difference plane. Similarly, in the 1HL band and the 1LH band, since the ratio of the sum plane to the difference plane is 6:4, 60 KB is assigned to the sum plane, and 40 KB is assigned to the difference plane. In the 1HH band, since the ratio of the sum plane to the difference plane is 4:6, 40 KB is assigned to the sum plane, and 60 KB is assigned to the difference plane.

The code amounts of the sum plane and the difference plane are thus assigned for each sub-band. Note that the code amount setting of the sum plane and the difference plane for each sub-band is executed by the code amount control unit 127. Note that in this embodiment, an example of processing on a frame basis has been described. However, the image may be divided into an arbitrary size, and the above-described processing may be executed independently for each divided image.

According to the above-described embodiment, the code amounts of the sum plane and the difference plane can finely be set for each sub-band. More specifically, the target code amounts are weighted such that the code amount of the sum plane corresponding to the low frequency band of the green component of RAW data is increased in the sub-band in the low frequency band, and the code amount of the difference plane corresponding to the high frequency band of the green component of RAW data is increased in the sub-band in the high frequency band. As a result, not only the low-frequency component but also the high-frequency component can be left, and degradation of image quality can be suppressed.

Note that in this embodiment, the sum of the code amounts of the sum plane and the difference plane is set to the same value for the sub-bands. However, a different value may be set for each sub-band. For example, instead of setting 100 KB for all of the 0LL, 1HL, 1LH, and 1HH bands, 130 KB may be set for the 0LL band, 100 KB may be set for the 1HL and 1LH bands, and 70 KB may be set for the 1HH band.

Fourth Embodiment

Figure 12:
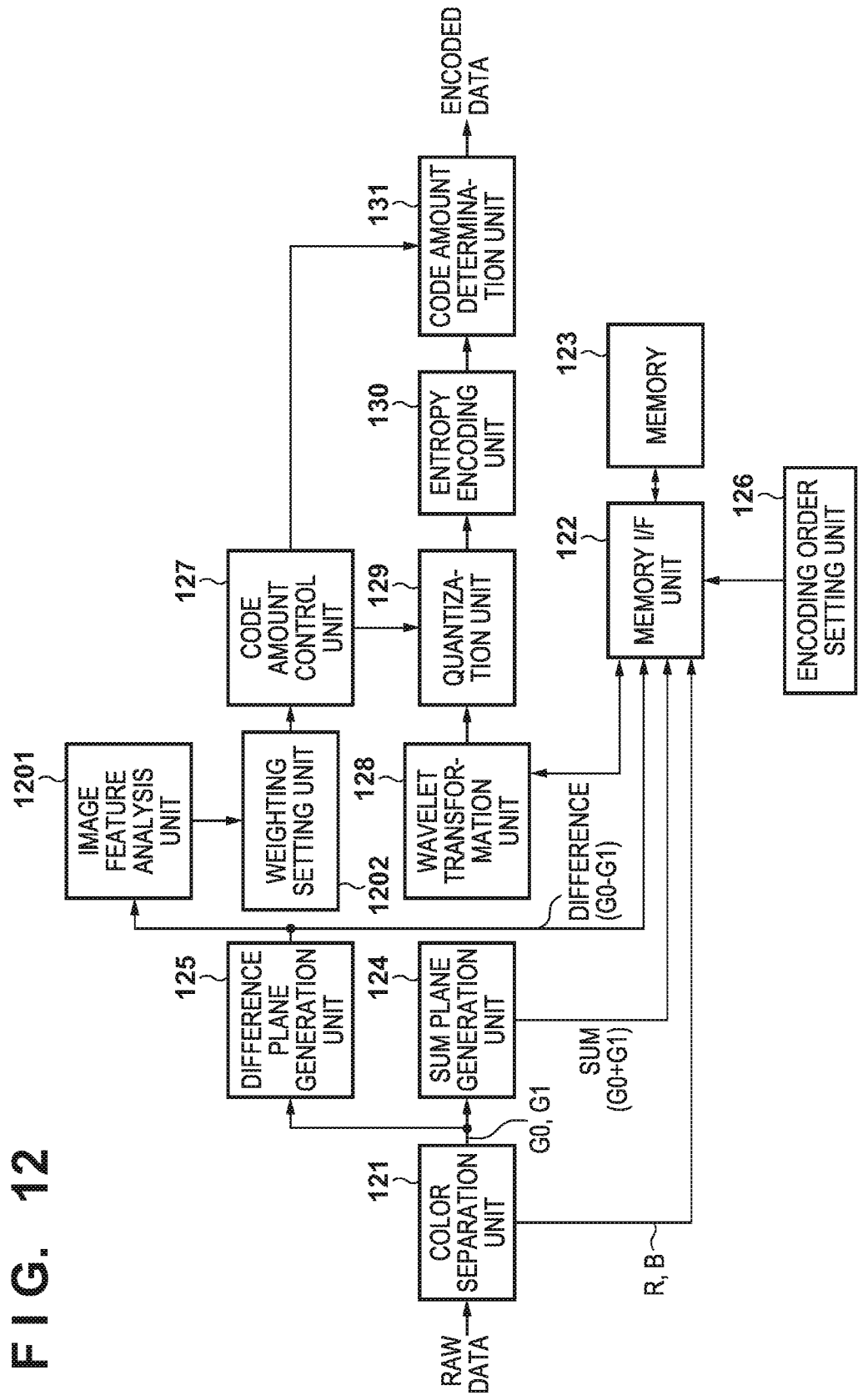
FIG. 12 is a block diagram showing an example of the arrangement of an image processing unit according to the fourth embodiment of the invention.

An encoding method corresponding to the fourth embodiment of the invention will be described next. In this embodiment, when weighting the target code amounts of a sum plane and a difference plane, the generated code amount of the difference plane is predicted from the variation in the difference value between the G0 plane and the G1 plane included in the difference plane and dynamically changes the weighting. In this embodiment, an image capturing apparatus 100 has the same arrangements as that shown in FIG. 1A of the first embodiment. However, an image processing unit 104 serving as an encoding unit according to this embodiment has an arrangement as shown in FIG. 12. The arrangement of the image processing unit 104 according to this embodiment is different from the arrangement shown in FIG. 1B in that an image feature analysis unit 1201 and a weighting setting unit 1202 are provided to perform image feature analysis processing and weighting setting processing. Note that the same reference numerals as in FIG. 1B denote the same parts in FIG. 12, and a description thereof will be omitted here.

Figure 13:
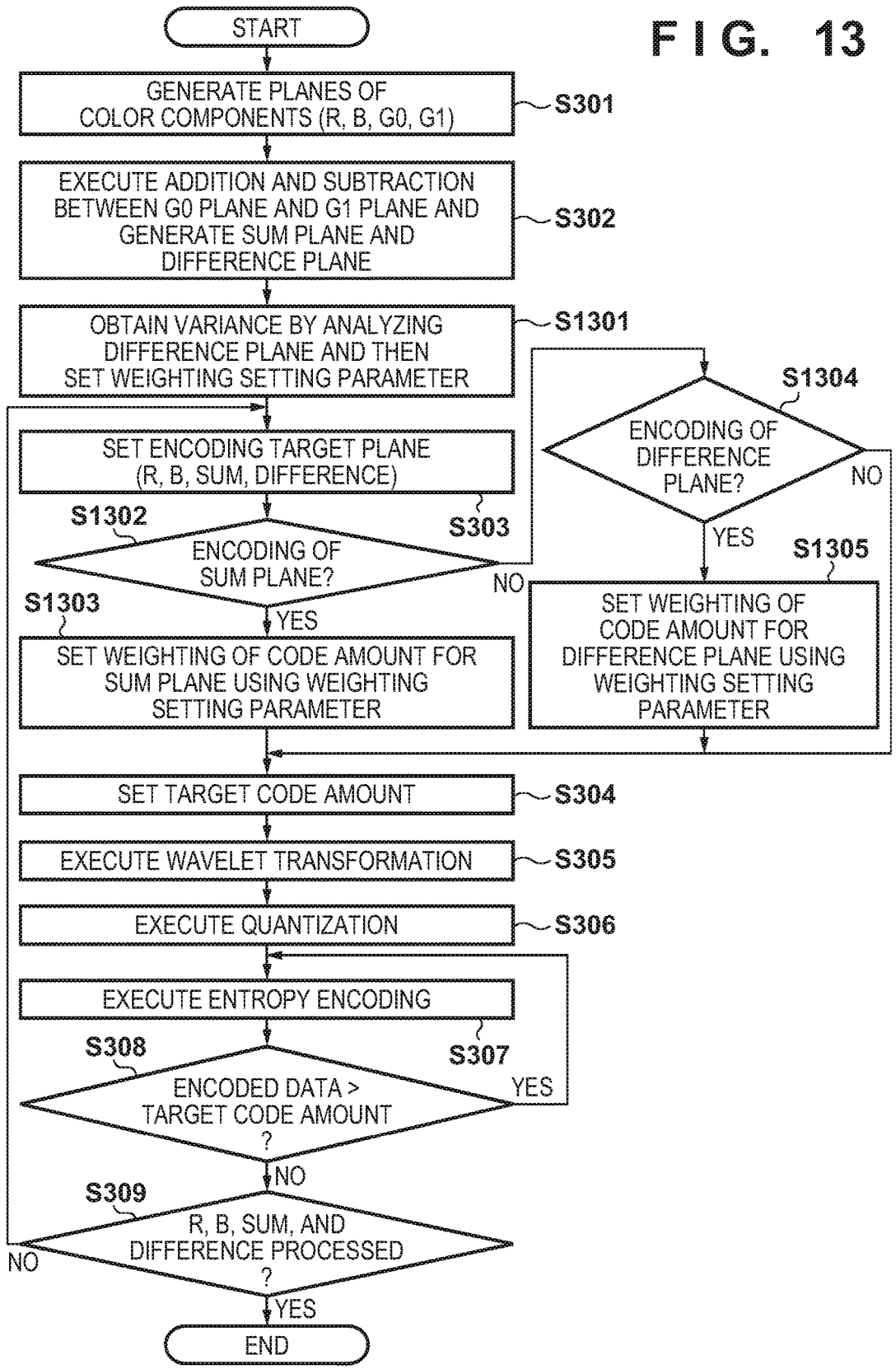
FIG. 13 is a flowchart showing an example of an encoding operation according to the fourth embodiment of the invention.

An encoding operation according to this embodiment will be described below with reference to the flowchart of FIG. 13. Note that the same step numbers as in the first embodiment denote the same processes, and only a brief description thereof will be made here.

First, as in the first embodiment, in steps S301 and S302, the planes of R, B, G0, and G1 components are formed, and a sum plane and a difference plane are generated using the G0 and G1 planes. After that, in step S1301, the image feature analysis unit 1201 analyzes the variation in the pixel values of the difference plane, and the weighting setting unit 1202 sets, based on the analysis information, a parameter Y to be used to set the weighting of the code amounts of the sum plane and the difference plane. In this embodiment, when analyzing the variation, a variance based on $$\delta = \frac{1}{m} \times \sum_{i=1}^{m} (x^\wedge - xi)^2 \qquad (3)$$

is used, where δ is the variance, m is the total number of components included in the difference plane, $x^\wedge$ is the average value of all the components of the difference plane, and xi is the value of the ith component out of the first to mth components included in the difference plane.

The weighting setting unit 1202 has a plurality of thresholds, and sets the parameter Y by comparing the variance output from the image feature analysis unit 1201 with the thresholds. A detailed example of a method of setting the parameter Y will be described later. After the parameter Y is set, in step S303, an encoding order setting unit 126 sets one of the R, B, sum, and difference planes for which encoding processing should be executed. In this embodiment, for example, the order is set as sum, difference, R, and B. In step S1302, it is determined whether the encoding order setting unit 126 sets the sum plane as the encoding target. If the sum plane is set as the encoding target, in step S1303, a code amount control unit 127 sets the weighting of the code amount of the sum plane based on the parameter Y. If the sum plane is not set as the encoding target, it is determined in step S1304 whether the encoding order setting unit 126 sets the difference plane as the encoding target. If the difference plane is set as the encoding target, in step S1305, the code amount control unit 127 sets the weighting of the code amount of the difference plane based on the parameter Y. If the encoding target plane set by the encoding order setting unit 126 is neither the sum plane nor the difference plane (R or B plane), the basic target code amount is directly set. Here, a value obtained by equally dividing the target code amount of the entire RAW data by the number of planes can be used. After that, the code amount control unit 127 sets the target code amount on which the weighting for each plane is reflected, and then, the processes of steps S305 to S309 are performed as in the first embodiment.

The analysis of the variance of the difference plane and the weighting of the code amount will be described next. As described above, the weighting setting unit 1202 has a plurality of thresholds, and sets the weighting parameter Y by comparing the variance output from the image feature analysis unit 1201 with the thresholds. For example, assume that the thresholds are T1 and T2 (T1<T2), and the weighting parameters Y are 0, 1, and 2. When the variance δ of the difference plane is T1 or less (T1≥δ), Y=0. When the variance is a value between T1 and T2 (T1<δ<T2), Y=1. When the variance is T2 or more (T2≤δ), Y=2. If the variance δ of the difference plane is large, the generated code amount of the difference plane becomes large. If Y=2, which is set when the variance is large, the weighting is set such that the code amount of the difference plane is not reduced (is increased) as much as possible. In contrast, the smaller the variance is, the smaller the generated code amount of the difference plane is. Hence, if Y=0, which is set when the variance is small, the weighting is set such that the code amount of the sum plane is increased as much as possible.

As the target code amount before weighting, the basic target code amount is separately set by the code amount control unit 127. Here, a value obtained by equally dividing the target code amount of the entire RAW data by the number of planes is used. The weighting of the code amount is set such that the code amount of the sum plane becomes larger than that of the difference plane. An example of the weighting of the code amount will be described. When Y=0, the target code amount of the sum plane is increased by 10%, and the target code amount of the difference plane is decreased by 10%. When Y=1, the target code amount of the sum plane is decreased by 5%, and the target code amount of the difference plane is increased by 5%. When Y=2, the target code amount of the sum plane is decreased by 20%, and the target code amount of the difference plane is increased by 20%. Note that the ratio of the target code amounts described above is merely an example. As the variance of the difference plane becomes large, a larger target code amount is assigned to the difference plane. As the variance becomes small, a larger target code amount is assigned to the sum plane.

Note that in this embodiment, an example of processing on a frame basis has been described. However, the image may be divided into an arbitrary size, and the above-described processing may be executed independently for each divided image. In this embodiment, an example in which wavelet transformation is used has been described. However, a discrete cosine transform used in an encoding technique such as JPEG, JPEG XR, or MPEG-4 AVC may be used instead. In addition, the entropy encoding may be changed to Huffman coding.

According to this embodiment, a large target code amount is assigned to a low-frequency component as compared to the target code amount to a high-frequency component, and the target code amount to the high-frequency component is appropriately increased or decreased based on the feature of the image, thereby improving image quality. In an image with a clear outline, since the pixel value difference between adjacent pixels is large as compared to an image with a blurred outline, the variance of the difference plane is large. Hence, when the variance of the difference plane is large, a large target code amount is assigned to the difference plane, that is, the high-frequency component, thereby maintaining the outline of the image. In a flat image such as the sky in which the pixel value difference between adjacent pixels is small, the variance of the difference plane is small. Hence, when the variance of the difference plane is small, the target code amount of the difference plane is decreased, and the code amount of the sum plane, that is, the low-frequency component is increased, thereby improving the image quality.

Note that in this embodiment, the image feature analysis processing is performed for the difference plane. However, the image feature analysis processing may be performed for the sum plane or the R or B plane. In this case as well, it is possible to determine, based on the result of analysis processing, which one of the high-frequency component and the low-frequency component has a large amount, in other words, which component should be assigned a larger code amount, and decide which one of the difference plane and the sum plane should be assigned a large code amount. For example, in a case in which the variance of the sum plane is calculated, for an image of the sky or the like with a high flatness, it can be determined that the variance is small even in the sum plane, and the flatness is high, that is, the code amount to the sum plane should be increased. If the variance of the sum plane is large, it can be decided that the code amount to the difference plane should be increased in contrast.

Fifth Embodiment

An encoding method corresponding to the fifth embodiment will be described next. This embodiment is different from the first to fourth embodiments in the target code amount setting method. However, an image capturing apparatus 100 and an image processing unit 104 functioning as an encoding unit have the same arrangements as those shown in FIGS. 1A and 1B of the first embodiment. In this embodiment, weighting on a plane basis is performed, as in the second embodiment, and weighting on a sub-band basis is also performed, as in the third embodiment. Basic processing is the same, and a description thereof will be omitted. Only parts different from the first to fourth embodiments will be described with reference to FIGS. 14A and 14B.

Figure 14A:
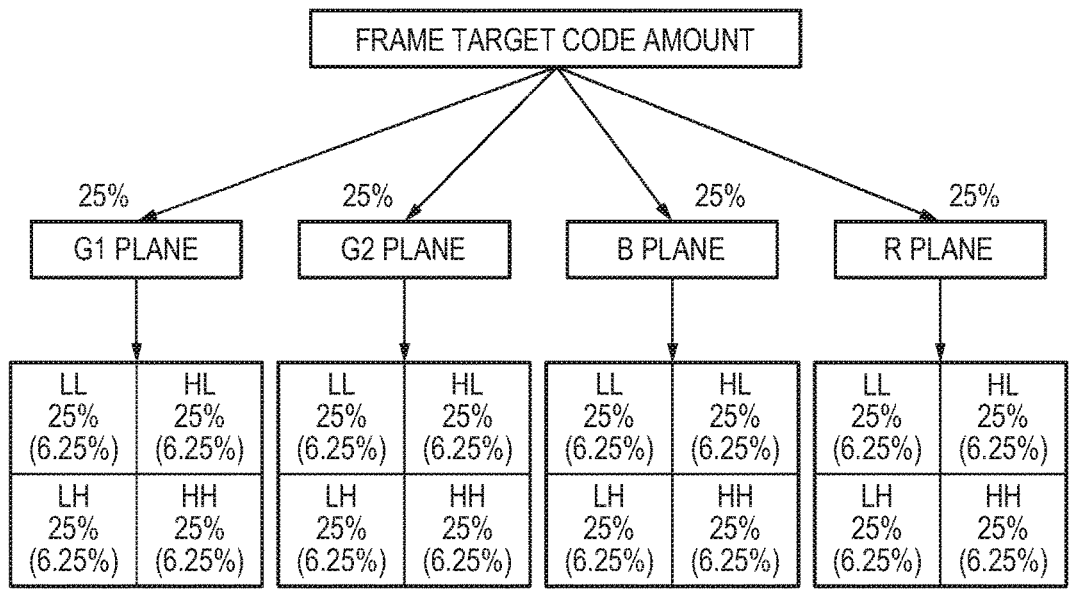
FIGS. 14A and 14B are views showing an example of the weighting of the target code amounts for each plane and each sub-band according to the fifth embodiment of the invention.

FIG. 14A shows a case in which when encoding is performed for each sub-band obtained by separating a RAW image of a Bayer arrangement into G1, G2, B, and R planes and wavelet-transforming the planes, target code amounts are assigned to the planes and sub-bands. In this case, the target code amounts are evenly assigned to the plane and the sub-bands.

When the target code amount to one frame of the RAW data is defined as 100%, each of the G1, G2, B, and R planes is assigned 25%. In a plane, when the target code amount assigned to the plane is defined as 100%, each of the sub-bands (LL, HL, LH, and HH) is assigned 25% of the target code amount. A parenthesized numerical value in each sub-band represents the target code amount assigned to the sub-band when the target code amount to one frame is defined as 100%.

Figure 14B:
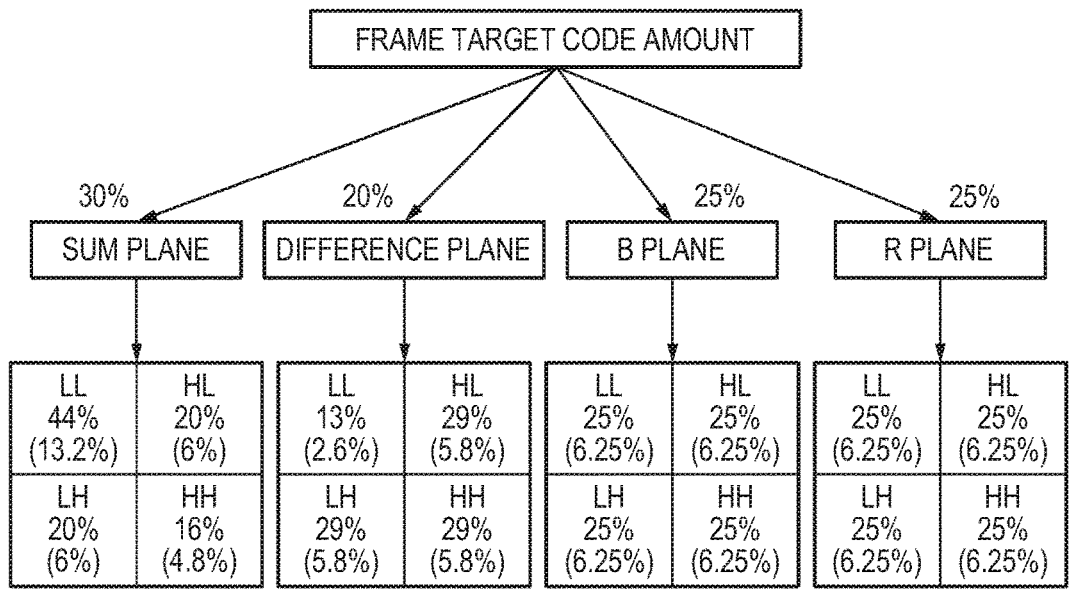

On the other hand, FIG. 14B shows assignment of target code amounts in a case in which when generating a sum plane and a difference plane from G1 and G2 planes and encoding the sum, difference, B, and R planes, weighting is performed in accordance with the planes and the sub-bands, and the target code amounts are then assigned. When the target code amount of one frame is defined as 100%, the sum plane is assigned 30%, the difference plane is assigned 20%, and each of the B and R planes is assigned 25%, as in FIG. 14A.

The sum plane corresponds to the low-frequency component of the green component of RAW data, and the difference plane corresponds to the high-frequency component of the green component. In image data, the low-frequency component is an important component. If the loss of the low-frequency component is large, image quality degrades. Hence, a large target code amount is assigned to the sum plane. Since the importance of the high-frequency component is lower than the low-frequency component, the difference plane is assigned a target code amount smaller than those of the sum plane, the B plane, and the R plane.

In addition, the target code amount of each plane is assigned to the sub-bands. In the sum plane, the sub-band target code amounts are assigned such that LL:HL:LH:HH=44:20:20:16. At this time, since the low-frequency component is still an important component, a larger target code amount is assigned to the sub-band in the low frequency band. When the target code amount to one frame is defined as 100%, the sum plane is assigned 30% of the target code amount. For this reason, the ratios of the target code amounts of the sub-bands to the target code amount of one frame are 13.2% for LL, 6% for HL, 6% for LH, and 4.8% for HH.

In the difference plane, the sub-band target code amounts are assigned such that LL:HL:LH:HH=13:29:29:29. At this time, the difference plane corresponds to the high-frequency component of the green component. Hence, in the difference plane, a larger target code amount is assigned to the sub-band in the high frequency band such that the ratio becomes higher than the assignment ratio of the target code amount to the sub-band in the high frequency band in other planes. Note that in the example shown in FIG. 14B, the assignment ratios of HL, LH, and HH are the same. However, the ratio of HH may be higher. When the target code amount to one frame is defined as 100%, the difference plane is assigned 20% of the plane target code amount. For this reason, the ratios of the target code amounts of the sub-bands to the target code amount of one frame are 2.6% for LL, 5.8% for HL, 5.8% for LH, and 5.8% for HH. The target code amount of the HH sub-band of the difference plane is larger than the target code amount of the HH sub-band of the sum plane. In each of the B and R planes, the sub-band target code amounts are assigned such that LL:HL:LH:HH=25:25:25:25. When the target code amount to one frame is defined as 100%, each of the B and R planes is assigned 25% of the plane target code amount. For this reason, the ratios of the target code amounts of the sub-bands to the target code amount of one frame are 6.25% for all sub-bands.

The target code amount given to one frame is assigned to the sub-bands at the above-described ratio, and quantization and encoding are performed based on the assigned target code amounts, as described in the above embodiments. In this embodiment, the target code amounts are assigned to the planes and the sub-bands at the target code amount ratios shown in FIGS. 14A and 14B. However, as in the fourth embodiment, image analysis may further be performed, and the target code amount ratios shown in FIGS. 14A and 14B may further be weighted in accordance with the analysis result, thereby deciding the target code amounts. In this case, as the result of image analysis, the plane target code amount may be weighted, or the sub-band target code amount may be weighted. Alternatively, both the plane target code amount and the sub-band target code amount may be weighted.

Other Embodiments

Embodiment(s) of the invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2015-214802, filed Oct. 30, 2015, and 2016-196000, filed Oct. 3, 2016, which are hereby incorporated by reference herein in their entirety.

What is claimed is:

1. An image processing apparatus for encoding image data of a Bayer arrangement, the apparatus comprising:
   one or more processors; and
   a memory storing instructions which, when the instructions are executed by the one or more processors, cause the one or more processors to function as units comprising:
   (1) a color separation unit configured to separate a plurality of color components of the image data into a plurality of plane image data based on the Bayer arrangement;
   (2) a first plane generation unit configured to generate first plane image data based on addition of components of the same color out of the plurality of plane image data;
   (3) a second plane generation unit configured to generate second plane image data based on subtraction of the components of the same color;
   (4) a transformation unit configured to transform plane image data including the first plane image data and the second plane image data into sub-bands in frequency bands respectively;
   (5) a setting unit configured to set a quantization parameter for each sub-band;
   (6) a quantization unit configured to quantize the sub-bands respectively based on the quantization parameter set by the setting unit; and
   (7) an encoding unit configured to compression-encode the sub-bands quantized by the quantization unit,
   wherein the setting unit sets the quantization parameter for each sub-band of the first plane image data and the second plane image data such that a ratio of a code amount of the sub-band in high frequency component to a total code amount of the second plane image data is higher than a ratio of a code amount of the sub-band in high frequency component to a total code amount of the first plane image data.

2. The apparatus according to claim 1, wherein the setting unit is further configured to set a target code amount for each plane image data and to set the quantization parameter for each sub-band based on the target code amount set for each plane image data, wherein the setting unit sets the target code amount for the first plane image data and the target code amount for the second plane image data to the same value.

3. The apparatus according to claim 2, further comprising an analysis unit configured to analyze an image feature of the image data and generate analysis information, wherein the setting unit is further configured to set the quantization parameter for each sub-band of the first plane image data and the second plane image data using the analysis information.

4. The apparatus according to claim 3, wherein the analysis information represents a variance of pixel values of the plane image data of the color components.

5. The apparatus according to claim 4, wherein the setting unit sets the quantization parameter such that the code amount assigned to the second plane image data becomes larger as the variance becomes large.

6. The apparatus according to claim 3, wherein the analysis information represents a variance of pixel values of the first plane image data.

7. The apparatus according to claim 3, wherein the analysis information represents a variance of pixel values of the second plane image data.

8. The apparatus according to claim 1, wherein the setting unit is further configured to set a target code amount for each plane image data and to set the quantization parameter for each sub-band based on the target code amount set for each plane image data, and wherein the setting unit sets the target code amount for the first plane image data to be larger than the target code amount for the second plane image data.

9. The apparatus according to claim 8, wherein a sum of the target code amount for the first plane image data and the target code amount for the second plane image data is the same as a sum in a case in which the target code amount for the first plane image data and the target code amount for the second plane image data are set to the same value.

10. The apparatus according to claim 1, wherein the Bayer arrangement includes a first green component, a second green component, a blue component, and a red component, and the components of the same color comprise the first green component and the second green component.

11. The apparatus according to claim 1, wherein the Bayer arrangement includes a first red component, a second red component, a first blue component, a second blue component, and a green component, and the components of the same color comprise the first red component and the second red component, and the first blue component and the second blue component.

12. An image processing apparatus for encoding image data of a Bayer arrangement, the apparatus comprising:

one or more processors; and a memory storing instructions which, when the instructions are executed by the one or more processors, cause the one or more processors to function as units comprising:

(1) a color separation unit configured to separate a plurality of color components of the image data into a plurality of plane image data based on the Bayer arrangement;

(2) a first plane generation unit configured to generate first plane image data based on addition of components of the same color out of the plurality of plane image data;

(3) a second plane generation unit configured to generate second plane image data based on subtraction of the components of the same color;

(4) a transformation unit configured to transform plane image data including the first plane image data and the second plane image data into sub-bands in frequency bands respectively;

(5) a setting unit configured to set a quantization parameter for each sub-band;

(6) a quantization unit configured to quantize the sub-bands respectively based on the quantization parameter set by the setting unit; and (7) an encoding unit configured to compression-encode the sub-bands quantized by the quantization unit, wherein the setting unit sets the quantization parameter of the first plane image data such that a larger code amount is assigned to a sub-band in a low frequency band than a sub-band in a high frequency band, and sets the quantization parameter of the second plane image data such that a larger code amount is assigned to the sub-band in the high frequency band than the sub-band in the low frequency band.

13. An image processing apparatus for encoding image data of a Bayer arrangement, the apparatus comprising:

one or more processors; and a memory storing instructions which, when the instructions are executed by the one or more processors, cause the one or more processors to function as units comprising:

(1) a color separation unit configured to separate a plurality of color components of the image data into a plurality of plane image data based on the Bayer arrangement;

(2) a first plane generation unit configured to generate first plane image data based on addition of components of the same color out of the plurality of plane image data;

(3) a second plane generation unit configured to generate second plane image data based on subtraction of the components of the same color;

(4) a transformation unit configured to transform plane image data including the first plane image data and the second plane image data into sub-bands in frequency bands respectively;

(5) a setting unit configured to set a quantization parameter for each sub-band;

(6) a quantization unit configured to quantize the sub-bands respectively based on the quantization parameter set by the setting unit;

(7) an encoding unit configured to compression-encode the sub-bands quantized by the quantization unit, wherein the setting unit sets the quantization parameter for each sub-band of the first image plane data and the second plane image data such that the code amount of the first plane image data is larger than the code amount of the second plane image data, and the code amount of an HH sub-band of the second plane image data is larger than the code amount of the HH sub-band of the first plane image data.

14. An image processing method of encoding image data of a Bayer arrangement, the method comprising:

separating a plurality of color components of the image data into a plurality of plane image data based on the Bayer arrangement;

generating first plane image data based on addition of components of the same color out of the plurality of plane image data;

generating second plane image data based on subtraction of the components of the same color;

transforming plane image data including the first plane image data and the second plane image data into sub-bands of frequency bands respectively;

setting a quantization parameter for each sub-band;

quantizing the sub-bands respectively based on the quantization parameter set in the setting; and compression-encoding the sub-bands quantized in the quantizing, wherein in the setting, the quantization parameter is set for each sub-band of the first plane image data and the second plane image data such that a ratio of a code amount of the sub-band in high frequency component to a total code amount of the second plane image data is higher than a ratio of a code amount of the sub-band in high frequency component to a total code amount of the first plane image data.

15. A non-transitory computer-readable storage medium storing a computer program which causes a computer to perform an image processing method of encoding image data of a Bayer arrangement, the method comprising:

separating a plurality of color components of the image data into a plurality of plane image data based on the Bayer arrangement;

generating first plane image data based on addition of components of the same color out of the plurality of plane image data;

generating second plane image data based on subtraction of the components of the same color;

transforming plane image data including the first plane image data and the second plane image data into sub-bands of frequency bands respectively;

setting a quantization parameter for each sub-band;

quantizing the sub-bands respectively based on the quantization parameter set in the setting; and compression-encoding the sub-band data quantized in the quantizing, wherein in the setting, the quantization parameter is set for each sub-band of the first plane image data and the second plane image data such that a ratio of a code amount of the sub-band in high frequency component to a total code amount of the second plane image data is higher than a ratio of a code amount of the sub-band in high frequency component to a total code amount of the first plane image data.

* * * * *